Feb. 23, 1965    R. A. PARKS    3,170,389
AUTO BODY SALVAGE PRESS
Filed Oct. 15, 1962    3 Sheets-Sheet 1

INVENTOR.
ROY A PARKS
BY Clarence M. Tuck

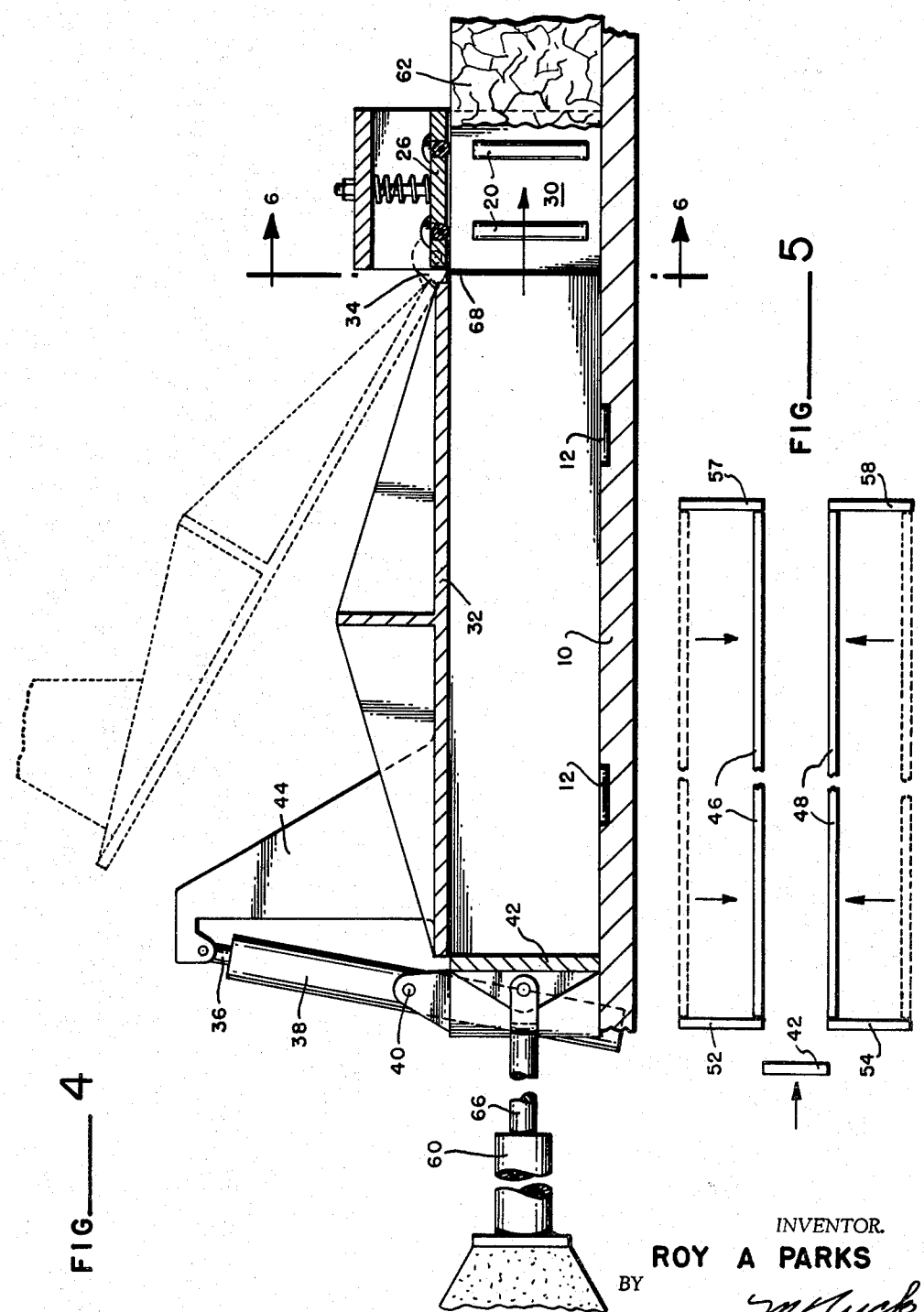

Feb. 23, 1965 R. A. PARKS 3,170,389
AUTO BODY SALVAGE PRESS
Filed Oct. 15, 1962 3 Sheets-Sheet 3

INVENTOR.
ROY A PARKS
BY
*Clarence M. Tuck*

United States Patent Office 3,170,389
Patented Feb. 23, 1965

3,170,389
AUTO BODY SALVAGE PRESS
Roy A. Parks, 5628 University Way, Seattle, Wash.
Filed Oct. 15, 1962, Ser. No. 230,331
9 Claims. (Cl. 100—192)

This invention relates to the general art of pressure baling devices which have for their purpose the compacting of bulky goods. More particularly, this present invention relates to means for accepting a stripped automobile body and by movable walls and top compacting the same into about one fifth of its normal volume although this volume ratio is only an election meeting current commercial needs.

The steel from which automobile bodies are made is of high quality and has many commercial uses when melted and reformed into usable plate or shapes. In certain favorable localities the automobile bodies are stripped of salvage goods or materials that will not be acceptable for remelting as steel and these bodies are then compressed to a form, size and shape which can be conveniently fed into various forms of remelting means, particularly into electric furnaces and the like. However, since the bodies usually have paint on them which should be burned off, considerable space is required for junking the bodies and for burning off the paint and this must be accomplished in areas where heavy smoke will not be objectionable. It is also necessary that the bulk of the automobile body be greatly reduced if it is to be transported for any distance, otherwise the cost of transporting the uncompressed bodies many times exceeds their net worth as salvage material. In this present equipment I have provided a portable means which is preferably mounted upon an elongated trailer, often referred to as a fifth wheel trailer, so that the press can be taken to the place of need and the prime mover be freed for other purposes. It is therefore important that the pressing equipment be of a size that is not too great to be readily transported and is compact in form so that under optimum conditions the press may be circulated around through a number of automobile wrecking yards where it will quickly compress the stripped bodies which are ready for this operation so that the equipment may be moved to other yards for similar services.

In order to have a commercially acceptable mass of an automobile body the usual melting agencies require that the volume of the body be reduced to one fifth or less of its original bulk. This also makes transportation a relatively simple matter as even a compressed body is relatively light and a large number of them can be loaded onto a single transport truck so that they may be hauled profitably even for considerable distances.

The principal object of this present invention therefore is to provide a portable press adapted for the crushing of automobile bodies and other metal equipment of similar bulk.

A further object is to provide a portable press which is self-contained and which will reduce automobile bodies to a uniform bale which, while it may be likened to a hay baler does not require the use of wires or banding materials to hold it together because of the normal resistance to distortion of the metal bodies.

A further object of this present invention is to provide a self-contained press which will accept an automobile body, flatten the same, then press in the sides, and as a final step in the pressing, apply pressure to one end of the reduced cross-section so that in the act of discharging the compressed body from the press the body will be further compacted, resulting in a package of uniform cross-section.

Further objects, advantages and capabilities will be apparent from the disclosure in the drawings or may be comprehended or are inherent in the device.

In the drawings:

FIGURE 4 is a vertical cross-sectional view taken throughout the length of my press showing the cover in full line position in its down or compressed form and illustrating the open position of the same in dashed lines.

FIGURE 5 is a diagrammatic view on the same general scale as FIGURES 1 and 2 and illustrates the movement of the movable parts of my equipment and also shows the elements that do not move.

Figure 1:
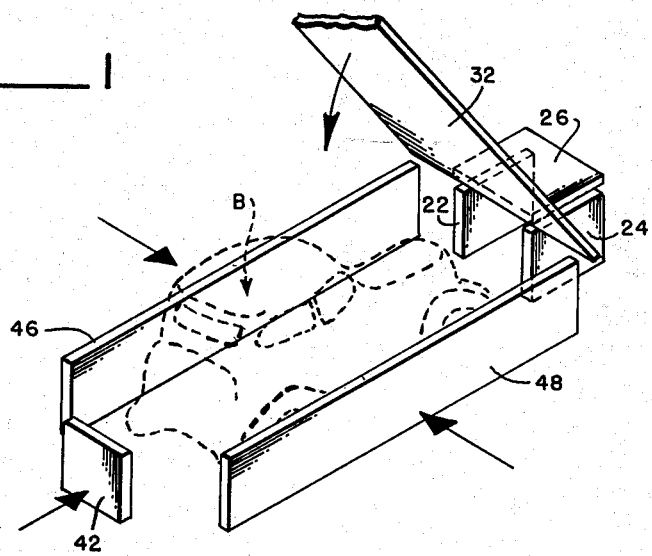
FIGURE 1 is a perspective view showing diagrammatically the movement of the different elements of my press as it compacts an automobile body.

Referring to the drawings, throughout which like reference numerals indicate like parts, in FIGURE 4 the numeral 10 designates the base or floor member of my press. This may be formed of any convenient material ranging from reinforced cementitious materials to steel fabrication. In order to provide for the minimum of friction I prefer to employ a plurality of inset rollers as 12 in the floor so as to carry the weight of compression side plates 46 and 48 and keep friction to a minimum.

Figure 6:
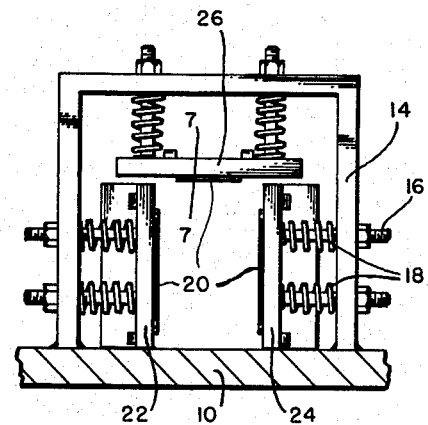
FIGURE 6 is a vertical cross-sectional view along the line 6—6 of FIGURE 4 and illustrates the resilient mounting of the side and top plates at the point of discharge from my press.
Figure 7:
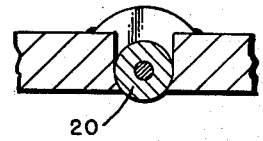
FIGURE 7 is a fragmentary cross-sectional view taken along the line 7—7 of FIGURE 6.

At one end, which is the discharge end of the press, a yoke 14 is provided. This yoke provides guide means for the plurality of relatively large bolts 16 and also a backing for the springs 18 employed to maintain pressure on the compacted mass. In these three elements, as will be noted in FIGURE 6, it is desirable to employ inset rollers as 20 whose construction is probably best shown in FIGURE 7. These rollers are employed in the two side plates 22 and 24 and also in the top plate 26 to provide anti-friction means and facilitate the application of pressure by springs 18 without placing too great a load on ram 42.

Pivotally secured adjacent the front end of the discharge tunnel structure, indicated generally by the reference character 30, is the top pressure plate 32 which is pivoted at 34. The opposite or free end of plate 32 is engaged by the hydraulic cylinder piston 36 operating in the relatively long hydraulic cylinder 38. This cylinder, as a matter of convenience is pivoted at 40, and because of the ram 42, provision is provided preferably for two of these. These apply their pressure to plate 32 by means of the overhanging bracket 44.

Figure 8:
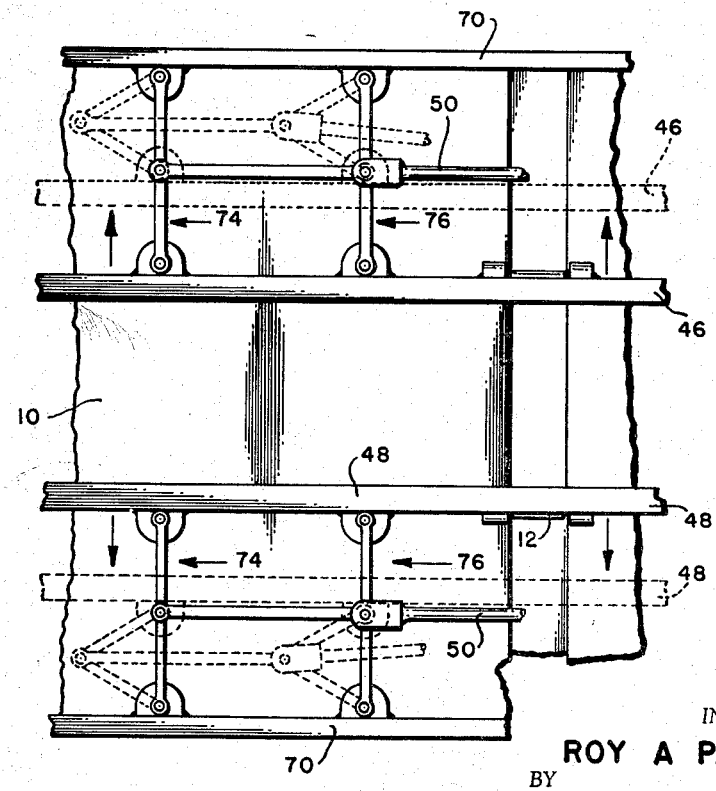
FIGURE 8 illustrates one means for bringing the side walls into the compressing operation, the same employing a toggle mechanism as one preferred solution.

In order to complete the compacting of the automobile body B, movable side walls 46 and 48 are required. These, as will be noted in FIGURE 2, should have a height which will be the same as the presser member 42 and the height of the interior of the discharge tunnel 30. The need for this will be most apparent from a study of FIGURE 2 where it will be observed that the top pressure plate 32 must be wide enough to engage the entire width of the automobile body before it is compressed and it must then hold its compression while the sides and one end are brought in to complete the compacting of the body. For these reasons the equipment employed in this press must follow that of presses in general and be adequately strong for the pressures that are applied even though the pressures may be applied only for a relatively short period. A preferred method of moving the side plates 46 and 48 is illustrated in FIGURE 8. In this figure, which is diagramamtic in effect, two opposed movable sides 46 and 48 are employed. In their initial positions of FIGURE 1, 46 and 48 are in the dotted line positions as shown in FIGURE 8 and then by means of the toggle arrangement, of which only a portion is illustrated, pressure is applied by the pivoted connecting rod 50 whose energy may be supplied from any suitable means, as a pivoted hydraulic cylinder, for instance.

*Method of operation*

In using this equipment, the automobile body, stripped of everything that is not steel or meltable, is placed within the confines of walls 42, 46 and 48, as shown in FIGURE 1. Side walls 46 and 48 are brought in to engage the body and center it. The next operation is for the cover 32 to be brought down on the body, which extends considerably above the height of walls 46 and 48 and thus the initial pressing of the body is obtained. When cover 32 or the top pressure plate is brought down substantially in engagement with side walls 46 and 48, the only clearance provided is just sufficient to prevent encountering undue friction in moving the side walls in towards each other. The next step in the pressing operation is to move side walls 46 and 48 inwardly, and as cover 32 is already held in place by cylinders 38, a very pronounced compacting of the automobile body occurs. Attention is invited to FIGURE 5 in which fixed end wall portions 52 and 54 are employed. These do not move but are provided so that any tendency for the body to move outwardly around the relatively small compressor face 42 will be resisted at this point.

Figure 2:
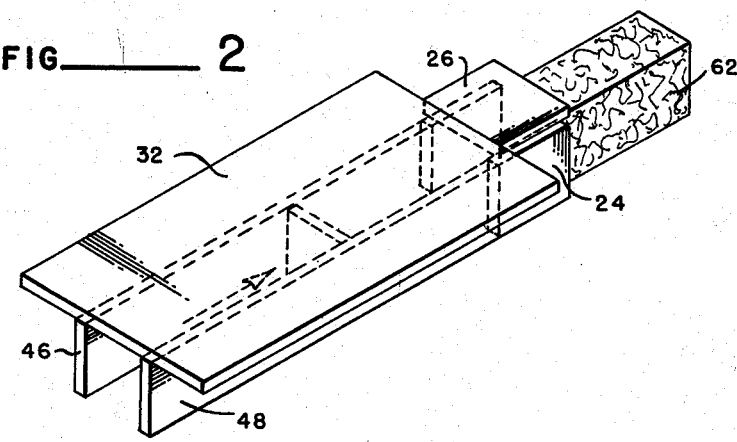
FIGURE 2 shows the final positioning of the parts of FIGURE 1 and shows approximately, the relative size of the compacted mass as it is ejected from the press.
Figure 3:
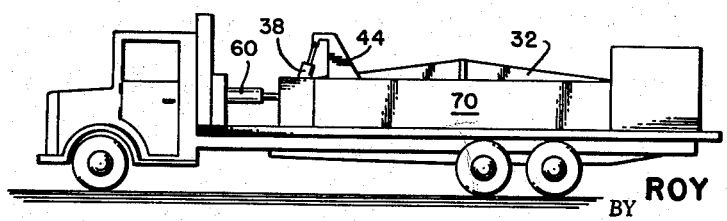
FIGURE 3 shows one form of transportation for my press.

At this stage of the operation the automobile body B is reduced to a cross-section as indicated by the finished extrusion 62 in FIGURE 2, but it is not necessarily very compact. The movement of the movable end wall 42 by the cylinder ram 60 starts the endwise compression of the automobile body which is now confined between the floor 10, the upper pressure plate 32 and the side walls 46 and 48. Obviously a plurality of cylinder rams 60 could be provided if desired. A final resistance is provided by the bale 62 previously made. The rollers 20 in the discharge tunnel 30 are to regulate the resistance in association with bolts 16 and springs 18, so the desired compactness can be produced, to control the length of the bales 62. Consequently pressure plate 42, as it is moved to the right as viewed in FIGURE 4, gives the final compacting to the automobile body. Experience has shown that a five to one ratio between the bulk of the original body and the bale 62 as extruded from the press is a satisfactory ratio and one that can be obtained cheaply so as to make the project commercially acceptable and gives a sufficient compacting so that a large number of automobile bodies can be transported on a single transport truck, thus greatly reducing the cost of this operation. As cylinder ram 60, by means of the piston rod 66, moves the pressure plate 42 to the right as viewed, the automobile body will be reduced to the optimum compressed volume when it abuts the previously made bale 62 and moves it out of the press. This action also moves a good portion of the new bale out of the press, this operation being similar, to a degree, to that of the ordinary hay baler. When pressure plate 42 has moved down to the point indicated at 68 the press is then cleared ready for another automobile body B and the cycle is repeated. It will be appreciated that the spring biased plates 22, 24 and 26 of discharge tunnel 30, together with rollers 20 serve to provide enough friction on the bale so that movable end or pressure wall 42 compacts the bale endwise. Thus, no actual compaction is provided by the discharge tunnel 30.

Referring to FIGURE 8 the toggle arrangement is shown with its associated parts. The piston rods 50 may be energized by any suitable means and serve to move the coacting pairs of arms 74 and 76 from their dotted line positions to the full line position. This action moves compressing side walls 46 and 48 from their dotted line position to the full line positions where side compression is completed. The walls 70 are fixed and form the anchorage for the plurality of toggle arm assemblies.

It is believed that it will be clearly apparent from the above description and the disclosure in the drawings that the invention comprehends a novel construction of auto body salvage presses.

Having thus described my invention, I claim:

1. An automobile body salvage press, comprising: (a) a floor supporting base surface, a generally rectangular dimensionally changeable unobstructed compression chamber having a pair of upstanding generally opposed, spaced-apart, parallel and transversely movable side compression walls on said base surface, each of said side compression walls including a first actuating means therefor, a top pressure wall means between said side walls, said top wall means being hingedly anchored at one end and including second actuating means for moving it about its hinged end, a ram member at one end of and movable longitudinally through said compression chamber and including third actuating means therefor; (b) first anti-friction means in said base surface for carrying the weight of said side compression walls; (c) a discharge tunnel means on said base surface coaxially disposed at the end of said compression chamber opposite said ram member and having pressure spring backed top and side plates; and (d) second anti-friction means on the inner surfaces of said top and side plates for permitting a compacted body to move out of said compression chamber and through said discharge tunnel means.

2. The structure according to claim 1 and in which said first and second anti-friction means are rollers.

3. The structure according to claim 1 and in which said top and side plates include adjusting means for varying the spring pressure.

4. An automobile body salvage press, comprising: (a) a floor supporting base surface, an elongated generally rectangularly shaped, dimensionally changeable and unobstructed compression chamber having a pair of upstanding generally rectangular and opposed, spaced-apart parallel and transversely movable side compression walls on said base surface, each of said side compression walls including a first actuating means therefor, a top pressure wall means disposed over and covering the area between said side walls, said top pressure wall being movable so as to be raised above and lowered onto the upper edges of said side walls and including second actuating means connected thereto for raising and lowering said top wall, a ram member at one end of and movable through said compression chamber and including third actuating means therefor; (b) first anti-friction means in said base surface for carrying the weight of said side compression walls; (c) a discharge tunnel means mounted on said base surface coaxially disposed with and at the end of said compression chamber opposite said ram member and having pressure spring backed top and side plates; and (d) second anti-friction means on the inner surfaces of said top and side plates for permitting a compacted body to move out of said compression chamber and through said discharge tunnel means.

5. The press according to the structure of claim 4 and in which said first and second anti-friction means are rollers.

6. The structure according to claim 1 and in which said top and side plates include adjusting means for varying the spring pressure.

7. An automobile body salvage press, comprising: (a) a floor supporting base surface, a generally rectangular dimensionally changeable unobstructed compression chamber having a pair of upstanding generally opposed, spaced-apart, parallel and transversely movable side compression walls mounted on said base surface, each of said side compression walls including a first actuating means therefor, a top pressure wall means disposed over and covering the area between said side walls at both minimum and maximum distance between said side walls, said top wall means being hingedly anchored at one end along a pivot axis permitting said top wall means to rest on substantially all the upper edge of each of said side compression walls and including second actuating means at the other end thereof for moving it about its hinged end, a ram member at one end of and movable longitudinally through said compression chamber and including third actuating means therefor; (b) first anti-friction means in said base surface for bearing the weight of said side compression walls; (c) a discharge tunnel means means mounted on said base surface coaxially disposed at the end of said compression chamber opposite said ram member and having pressure spring backed top and side plates; and (d) anti-friction means on the inner surfaces of said top and side plates for permitting a compacted body to be forced out of said compression chamber and through said discharge tunnel means.

8. The press according to the structure of claim 7 and in which said first and second anti-friction means are rollers.

9. The press according to the structure of claim 7 and in which said first actuating means for each of said side compression walls are comprised of toggle type linkages.

References Cited by the Examiner

UNITED STATES PATENTS

| | | | |
|---|---|---|---|
| Re. 9,956 | 12/81 | Dederick | 100—192 X |
| 337,567 | 3/86 | Ertel | 100—191 |
| 358,898 | 3/87 | Sooy | 100—192 |
| 523,802 | 7/94 | Williams | 100—286 |
| 524,597 | 8/94 | Miller | 100—191 X |
| 1,540,784 | 6/25 | Langford | 100—232 |
| 2,086,992 | 7/37 | Weber. | |
| 2,324,869 | 7/43 | Oman | 100—151 X |
| 2,816,502 | 12/57 | Eismann | 100—232 X |
| 3,005,403 | 10/61 | Van Endert | 100—98 |

FOREIGN PATENTS 1,233,688  5/60  France.

WALTER A. SCHEEL, *Primary Examiner.*

A. G. STONE, CHARLES A. WILLMUTH, *Examiners.*